US007337977B2

(12) United States Patent
Chen et al.

(10) Patent No.: US 7,337,977 B2
(45) Date of Patent: Mar. 4, 2008

(54) UNIVERSAL MICRO MEMORY CARD

(75) Inventors: Chia-Li Chen, Hsindien (TW); Hsiang-An Hsieh, Hsindien (TW)

(73) Assignee: Carry Computer Eng. Co., Ltd., Hsin-Dian (TW)

( * ) Notice: Subject to any disclaimer, the term of this patent is extended or adjusted under 35 U.S.C. 154(b) by 46 days.

(21) Appl. No.: 10/639,498

(22) Filed: Aug. 13, 2003

(65) Prior Publication Data

US 2004/0182938 A1 Sep. 23, 2004

(30) Foreign Application Priority Data

Mar. 21, 2003 (TW) .............................. 92106373 A

(51) Int. Cl.
*G06K 19/06* (2006.01)
(52) U.S. Cl. ...................... 235/492; 235/441; 235/451
(58) Field of Classification Search ................ 235/492, 235/441, 451; 710/8, 10, 11, 14, 63
See application file for complete search history.

(56) References Cited

U.S. PATENT DOCUMENTS

| | | | | |
|---|---|---|---|---|
| 6,151,647 | A * | 11/2000 | Sarat | 710/11 |
| 6,168,077 | B1 * | 1/2001 | Gray et al. | 235/375 |
| 6,182,162 | B1 * | 1/2001 | Estakhri et al. | 710/11 |
| 6,385,667 | B1 * | 5/2002 | Estakhri et al. | 710/8 |
| 6,439,464 | B1 * | 8/2002 | Fruhauf et al. | 235/492 |
| 6,642,614 | B1 * | 11/2003 | Chen | 257/690 |
| 6,684,283 | B1 * | 1/2004 | Harris et al. | 710/10 |
| 6,721,819 | B2 * | 4/2004 | Estakhri et al. | 710/11 |
| 6,725,291 | B2 * | 4/2004 | Lai et al. | 710/14 |
| 6,744,634 | B2 * | 6/2004 | Yen | 361/752 |
| 6,745,267 | B2 * | 6/2004 | Chen et al. | 710/74 |
| 6,783,399 | B2 * | 8/2004 | Joung | 439/630 |
| 2003/0172263 | A1 * | 9/2003 | Liu | 713/156 |
| 2003/0212848 | A1 * | 11/2003 | Liu et al. | 710/305 |
| 2003/0233507 | A1 * | 12/2003 | Yu et al. | 710/310 |
| 2004/0059846 | A1 * | 3/2004 | Liu et al. | 710/62 |
| 2004/0070952 | A1 * | 4/2004 | Higuchi et al. | 361/737 |

FOREIGN PATENT DOCUMENTS

WO WO 9945461 A2 * 9/1999

* cited by examiner

*Primary Examiner*—Uyen-Chau N Le

(57) ABSTRACT

A universal micro memory card has a unique common transmission interface designed according to USB specifications, USB pins and data transmission pins. The universal micro card detects what type a system interface connected to it is and the initialization signals are sent from the system end via the USB pins (D+ and D−). Further, the universal micro card is switched to the corresponding working mode. In this way, the universal micro memory card enables signal transmission from/to different memory card systems via the common transmission interface.

5 Claims, 6 Drawing Sheets

| Pin | USB | | MS Series | | SD | |
|---|---|---|---|---|---|---|
| 1 | VBUS | Positive pole of power supply | VSS | Negative pole of power supply | D3 | Data transmission line 3 |
| 2 | D- | Tandem differential signals | BS | Interface state control line | CMD | Instruction state transmission line |
| 3 | D+ | Tandem differential signals | D1 | Data transmission line 1 | VSS | Negative pole of power supply |
| 4 | GND | Negative pole of power supply | D0 | Data transmission line 0 | VDD | Positive pole of power supply |
| 5 | - | - | D2 | Data transmission line 2 | CLK | Synchronous clock pulse transmission line |
| 6 | - | - | INS | Card insertion detection signal | VSS | Negative pole of power supply |
| 7 | - | - | D3 | Data transmission line 3 | D0 | Data transmission line 0 |
| 8 | - | - | CLK | Synchronous clock pulse transmission line | D1 | Data transmission line 1 |
| 9 | - | - | VCC | Positive pole of power supply | D2 | Data transmission line 2 |
| 10 | - | - | VSS | Negative pole of power supply | - | - |

Fig.1

| Micro Memory Card | | USB | | MS Series | | SD | |
|---|---|---|---|---|---|---|---|
| 1 | VCC | 1 | VCC | 9 | VCC | 4 | VDD |
| 2 | MF1 | 2 | D+ | 2 | CLK | 2 | CLK |
| 3 | MF2 | 3 | D- | 8 | BS | 5 | CMD |
| 4 | GND | 4 | GND | 1,10,6 | VSS | 3,6 | VSS |
| 5 | D0 | - | - | 4 | D0 | 7 | D0 |
| 6 | D1 | - | - | 3 | D1 | 8 | D1 |
| 7 | D2 | - | - | 5 | D2 | 9 | D2 |
| 8 | D3 | - | - | 7 | D3 | 1 | D3 |

Fig.2

UNIVERSAL MICRO MEMORY CARD

FIELD OF THE INVENTION

This invention is related to a rewritable micro memory card, in particular a rewritable micro memory card adaptive to different memory card systems.

RELATED ARTS OF THE INVENTION

Due to the vast market value of micro memory cards, manufacturers exert their best to promote own versions, expecting their memory card products to be major ones. However, the competition has led to memory cards from those manufacturers different from each other both in mechanical dimension but also in electric interface, instruction set, data transmission protocol, and control mode, aggravating the diversification of memory card specifications and supporting system interfaces. That situation brings not only embarrassment to consumers but also difficulty in the development of information appliances, digital electronic devices, and peripheral equipment for computers.

To solve above problem, experts in the industry have designed a memory card adapter supporting different memory cards. Said adapter consolidates specifications, dimensions, and circuits of different memory cards into a single all-in-one read/write slot and is connected to a computer system via a transmission interface (e.g., USB, IEEE1394, PCMCIA, CF) to enable data transmission. However, said adapter has not storing capacity and is only designed for data transmission from/to the memory card. Furthermore, said adapter can be used directly in digital cameras, PDAs or IAs.

Therefore, it is urgent task to develop a memory card that consolidates interface specifications, transmission protocols, and circuits of existing memory cards and can communicate to computers or various devices without the assistance of expensive adapting device. Such a memory card can eliminate embarrassment to consumers resulted from incompatible memory card specifications and expansive adapting devices.

DESCRIPTION OF THE INVENTION

The invention provides a universal micro memory card, which is a fruit designed by the inventor through tough study and tests with the aim to solve above problem and attain other efficacies, in order to facilitate our consumers in data transfer.

The main purpose of the invention is to provide a universal micro memory card, which not only operates normally with own system interface but also supports existing memory card system interfaces, such as SD and MS series interfaces.

Another purpose of the invention is to provide a universal micro memory card that supports USB interface, which has become the de facto standard for peripheral equipment.

To attain above purposes and efficacies, the universal micro memory card in the invention has a common transmission interface, through which data transmission may be done between different memory card systems and said micro memory card. Said common transmission interface is designed on the basis of USB interface, and has USB interface pins and at least a pin for data transmission.

Said universal micro memory card has not only redesigned transmission interface but also improved internal circuit. It is equipped with an internal rewritable memory chip. The universal micro memory card is featured with:

It utilizes the USB pins (D+ and D+) to transfer initialization signals from the interface of the memory card system and automatically detects potential variation in those initialization signals with the interface detection/switching circuit in the common transmission interface; then, it determines the type of memory card system interface and the corresponding signal transmission circuit to enable the micro controller to switch to the corresponding working mode that supports the memory card system interface. Then said universal micro memory card processes signals from a specific transmission route according to its working mode.

With above design, the micro memory card not only supports existing memory card system interfaces with its internal electric interface, instruction set, and data transmission protocol, but is compatible to existing memory card system interfaces in mechanical dimension of its interface. Thus said micro memory card is a universal micro memory card.

To understand above purpose and other purposes, features, and advantages of said micro memory card, the micro memory card is detailed in the following embodiments, with reference to attached drawings.

EMBODIMENTS OF THE INVENTION

The universal micro memory card in the present invention combines popular Memory Stick series (hereafter is referred to as S series and Secure Digital cards (hereafter is referred to as D with USB interface (widely used for peripheral equipments) into a common transmission interface to support different memory card systems.

Please referrers to FIG. 1, a list of USB/MS series/SD interface pins, signals names and properties. Though the number of pins of each interface is different from each other (USB: 4 pins, MS series: 10 pins, SD: 9 pins), we can see from the list that there are several identical pins between MS series interface and SD interface, such as power supply pin (VCC/VDD), grounding pin (VSS), data transmission pins (D0-D3), and clock pin (CLK). Moreover, a USB interface also has power supply pin (VCC), grounding pin (GND), and basic data transmission pins (D+ and D−). Therefore, the micro memory card in the present invention is designed on the basis of USB interface specification, with the combination of data transmission pins of MS series/SD interfaces, to form a common transmission interface, through which different memory card system interfaces (e.g., MS series/SD interfaces) can transfer data to/from said micro memory card.

Please referrers to FIG. 2, a comparative list of specifications/pins of said micro memory card and specifications/pins of other three types of system interfaces. From above FIG. 1 and FIG. 2 we can see that through appropriate alignment and consolidation (4 pins of a standard USB interface (as shown in FIG. 3)+another 4 pins serving as data transmission pins in MS series/SD interfaces (D0, D1, D2, and D3, as shown in FIG. 4)), a common transmission interface that supports above 3 interfaces may be implemented in said micro memory card.

In said common transmission interface, the positive power supply pin (VCC) of USB also serves as the positive power supply pins of MS series and SD interfaces (VCC/VDD), and the negative power supply pin (GND) of USB also serves as the negative power supply pins of MS series and SD interfaces (VSS). It should be noted that the $6^{th}$ Pin (INS) of MS series system interface is used by the system end to determine whether a memory card has been inserted in the system interface. Therefore, at the micro memory card end, that pin may be directly connected to the negative pole of power supply. That is to say, the $6^{th}$ pin may be deemed as VSS and share the same pin with VSS in the present invention.

Besides above shared pins, the D+ and D− pins of USB interface may be modified as multiplexed signal pin MF1 and MF2, which may be used to transfer corresponding signals according to the transmission protocol for the memory card system interface. In brief, a specific signal mode (transmission control signals or data signals) may be used according to the system interface being connected. For example, for above 3 types of system interfaces, in case said micro memory card is inserted into a USB system interface, MF1 will be switched to transfer D+ signals, and MF2 will be switched to transmission D− signals; in case said micro memory card is inserted into a MS series system interface, MF1 will be switched to transfer CLK signals, and MF2 will be switched to transfer BS signals; in case said micro memory card is inserted into a SD system interface, MF1 will be switched to transfer CLK signals, and MF2 will be switched to transfer CMD signals. In that way, only two pins are required to detect the type of system interface being used, thus different system interfaces may transfer corresponding signals via the two pins.

Hereunder we describe how signals transferred via MF1 and MF2 can be used as signals to detect the type of system interface being used, wherein said signals for detection of system interface is initialization signals transferred from the system interface to said micro memory card when said micro memory card is inserted into the system interface.

Please referrers to FIG. 5, FIG. 6, and FIG. 7, a time sequence drawing of initialization signals transferred via USB/MS series/SD system interface, respectively.

Wherein as shown in FIG. 5, when said micro memory card is inserted into a USB system interface, the potential variation in D− signals of USB interface will occur on MF2 (i.e., maintains at low potential); while the potential variation in D+ signals of USB interface will occur on MF1 (i.e., drops to low potential at 100 ms after rising to high potential, keeps for 10 ms, and then return to high potential).

As shown in FIG. 6, when said micro memory card is inserted into a MS series system interface, the potential variation in CLK signals of MS series interface will occur on MF2 (i.e., oscillating clock pulse signals received from the system end); while the potential variation in RS signals of MS series interface will occur on MF1 (i.e., maintains at low potential).

As shown in FIG. 7, when said micro memory card is inserted into a SD system interface, the potential variation in CLK signals of SD will occur on MF2 (i.e., oscillating clock pulse signals received from the system end); while the potential variation in CMD signals of SD interface will occur on MF1 (i.e., maintains at high potential).

In conclusion, when said universal micro memory card is inserted in a system interface, its internal circuit can receive initialization signals sent from the system end via the redefined MF1 pin (originally was D+pin of USB interface) and MF2 pin (originally was D− pin of USB interface) and detect potential variation in those initialization signals to determine the type of system interface being used.

Please see FIG. 8, a block chart of the internal circuit of said micro memory card in the present invention. Said micro memory card 8 comprises at least a common transmission interface 81, an interface detection/switching circuit 82, a micro controller 83, and a rewritable internal memory chip 86.

Wherein, the common transmission interface 81 is designed on the basis of USB interface specifications, with USB interface pins (e.g., VCC, GND, MF1 (D+), and MF2 (D−)), and additional data transmission pins (i.e., D0, D1, D2, and D3). From above description we can see that the embodiment receives initialization signals sent from the memory card system interface via MF1 (D+) and MF2 (D−) pins.

The interface detection/switching circuit 82 comprises detection circuit 821, switching circuit 822, and MF1 and MF2 pins of common transmission interface 81, wherein the detection circuit 821 is used to automatically detect the potential variation in initializations signals to determine the type of memory card system interface where said micro memory card 8 is inserted; while the switching circuit 822 switches the signal transmission route according to the detection result.

The micro controller 83 switches to the working mode (such as SD mode, MS series mode, or USB mode) corresponding to the memory card system interface being used according to the detection result of interface detection/switching circuit 82, and processes the signals through the specific transmission route according to the working mode.

In addition, said universal micro memory card 8 may also equipped with an internal data bus 842 and a control signal bus 841 to connect interface detection/switching circuit 82 and transfer data from/to micro controller 83 via a cache 87. Signals transferred through said data bus 842 are different from those transferred through said control signal bus 841, for example, data bus 842 may transfer D+ and D− signals of a USB system interface as well as D0 D3 signals of MS series/SD system interfaces; while control signal bus 841 may transfer CLK, BS, and CMD signals of MS series/SD system interfaces.

For example, for above 3 types of system interfaces (USB, MS series, SD), during the initialization phase performed at the system end, if the initialization signal transferred via MF2 is a low potential signal, the detection circuit 821 will instruct the switching circuit 822 to switch the transmission route to data bus 842 and transfer the detection result to micro controller 83, which switches to USB working mode.

When the power of system end started, if the initialization signal transferred via MF1 is a low potential signal, the detection circuit 821 will instruct the switching circuit 822 to switch the transmission route to control signal bus 841 and transfer the detection result to micro controller 83, which switches to SD working mode.

When the power of system end started, if the initialization signal transferred via MF1 is a high potential signal, the detection circuit 821 will instruct the switching circuit 822 to switch the transmission route to data bus 842 and transfer the detection result to micro controller 83, which switches to MS series working mode.

In that way, the micro controller 83 may process signals transferred from the system end with specific instruction set, data transmission protocol, and control mode according to above working modes.

Embodiments implemented according to above principle may automatically detect the type of system interface being used with said interface detection/switching circuit 82 and transfer the detection result to micro controller 83; however, the embedded program in the micro controller 83 may be modified to enable above interface detection/switching circuit 82 to detect whether any initialization signal is available and switch the signal transmission route but instruct the micro controller 83 to receive initialization signals and distinguish potential variation in those initialization signals, in order to determine the type of system interface where said micro memory card 8 is inserted and switch the micro memory card 8 to the working mode that supports the system interface as well as process signals from corresponding transmission route according to the working mode. Such a modified design is more flexible in circuit implementation.

In addition to above circuit, said micro memory card 8 also comprises an internal voltage transformation/protection circuit 85, which is connected to pin VCC and pin GND originally used for USB to transform voltage from different system interfaces to voltage suitable for the internal circuit of said micro memory card 8, providing voltage regulation and protection function.

It is appreciated that above embodiments are only used to disclose the present invention and should not constitute any limitation to the invention. Any expert familiar with the art may easily implement modifications or embellishments to the embodiments without deviating from the spirit and scope of the present invention. Therefore, any embodiment with equivalent modifications or embellishments shall fall in the scope of the invention, which is only confined to the claims attached.

BRIEF DESCRIPTION OF DRAWINGS

FIG. 1 is a list of labels, signal names and properties of USB/MS series/SD interface pins.

FIG. 2 is a comparative list of pins of the micro memory card in the present invention and those of other system interfaces.

Figure 3:
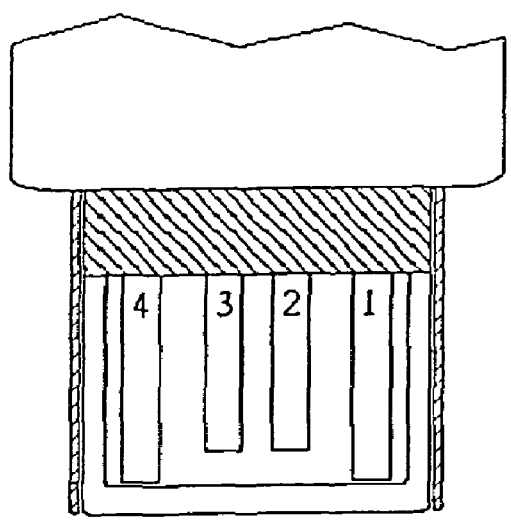
FIG. 3 shows the configuration of USB interfaces pins.
Figure 4:
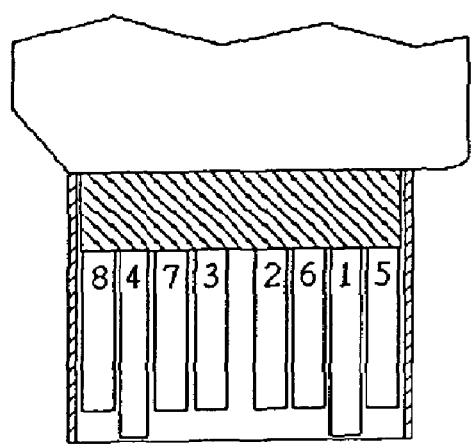
FIG. 4 shows the configuration of the micro memory card in the present invention.
Figure 5:
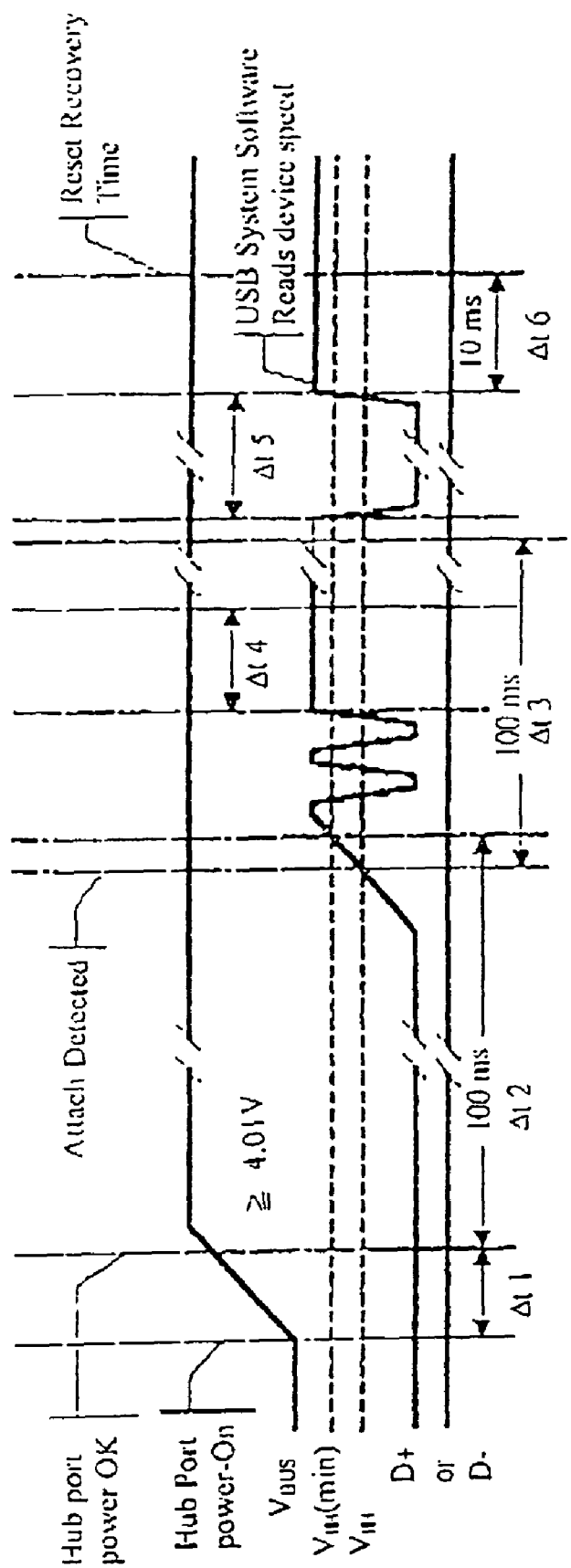
FIG. 5, FIG. 6, and FIG. 7 show time sequence diagram of initialization signals transferred via USB/MS series/SD system interfaces, respectively.
Figure 6:
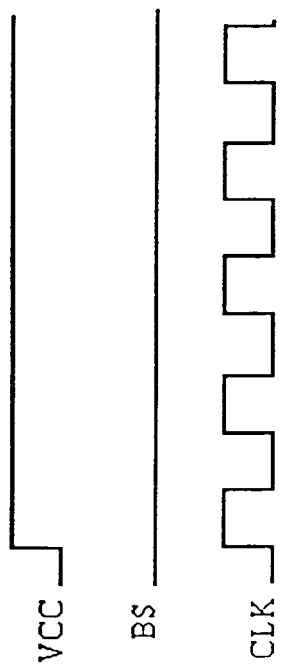
Figure 7:
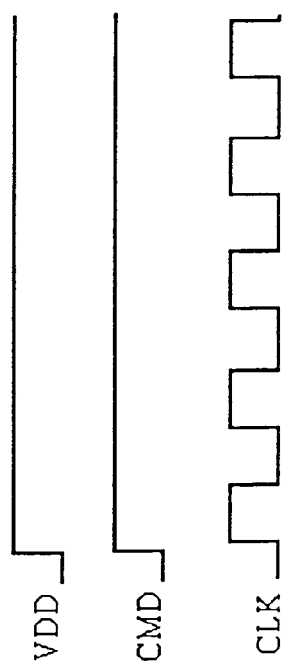
Figure 8:
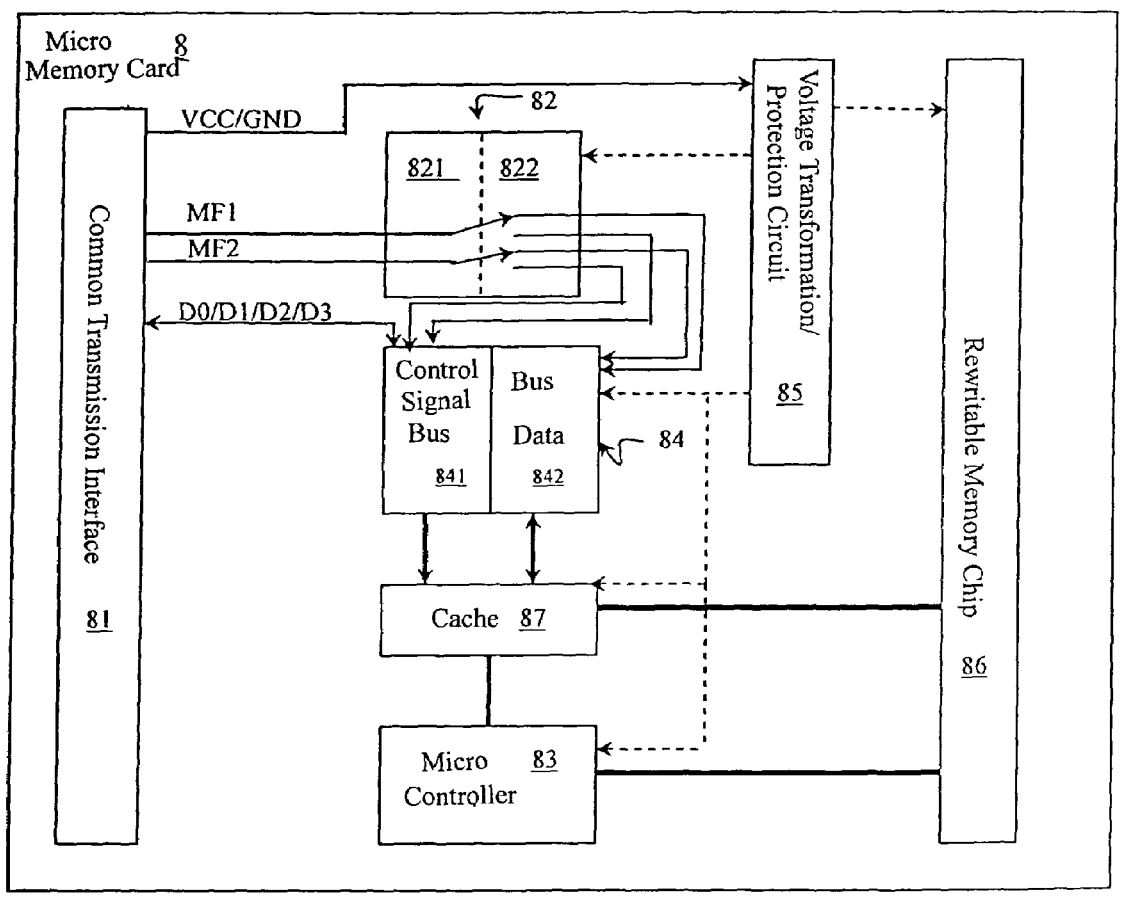
FIG. 8 is a block chart of internal circuit of the micro memory card in the present invention.

8: Micro Memory Card
  81: Common Transmission Interface
  82: Interface Detection/Switching Circuit
    821: Detection Circuit
    822: Switching Circuit
  83: Micro Controller
  84: Buses
    841: Control Signal Bus
    842: Data Bus
  85: power Transformation/Protection Circuit
  86: Rewritable Memory
  87: Cache

What is claimed is:

1. A universal micro memory card with an internal rewriteable memory comprising:
a common transmission interface providing a first pin for being connected to a positive pole of power supply (VCC), a second pin for a first multiplexed signal (MF1), a third pin for a second multiplexed signal (MF2), a fourth pin for connecting a negative pole of power supply (GND), a fifth pin for connecting with a number "0" data transmission line (D0), a sixth pin for connecting with a number "1" transmission line (D1), a seventh pin for connecting with a number "2" transmission line (D2) and a eight pin for connecting with a number "3" transmission line (D3);
a detection circuit and a switching circuit being electrically connected to said second pin (MF1) and said third pin (MF2) to detect a potential initialization signal at said second and third pins (MF1, MF2) respectively to determine if a system inserted with said universal micro memory card is a universal serial bus (USB) system, a memory stick series (MS) system or a secure digital card (SD) system;
a data bus being connected to said switching circuit and configured for receiving a plus tandem differential signal and a minus tandem differential signal respectively from said second pin (MF1) and said third pin (MF2) via said switching circuit;
a control signal bus being connected to said switching circuit and configured for receiving an interface state control line signal and an instruction state transmission line signal from said second pin (MF1) via said switching circuit and a synchronous clock pulse transmission line signal from said third pin (MF2) via said switching circuit; and
a micro controller being connected to said data bus and said control signal bus via a cache and performing an operation with a working mode adapted with said USB system, said SD system or said MS series system depending on detecting result of said detection circuit;
wherein, when said detecting result is said potential initialization signal at said third pin (MF2) being low potential, said working mode is adapted with USB system; when said detecting result is said potential initialization signal at said second pin (MF1) being low potential, said working mode is adapted with SD system; and when said detecting result is said initialization signal at said second pin (MF1) being high potential, said working mode is adapted with MS system.

2. The universal micro memory card with an internal rewriteable memory as defined in claim 1 further comprises a voltage transformation/protection circuit to connect with said first pin (VCC) and said fourth pin (GND) for transforming a system voltage into suitable voltage compatible for said micro memory card.

3. The universal micro memory card with an internal rewriteable memory as defined in claim 1, wherein said second pin (MF1) and said third pin (MF2) correspond to a plus tandem differential signal pin (D+) and a minus tandem differential signal pin (D−) provided with said USB system respectively.

4. The universal micro memory card with an internal rewriteable memory as defined in claim 1, wherein said second pin (MF1) and said third pin (MF2) correspond to a synchronous clock pulse transmission line (CLK) and an interface state control line (BS) provided with said MS series system respectively.

5. The universal micro memory card with an internal rewriteable memory as defined in claim 1, wherein said second pin (MF1) and said third (MF2) correspond to a synchronous clock pulse transmission line (CLK) and an instruction state transmission line (CMD) provided with said SD system respectively.

* * * * *